United States Patent

Nakahashi et al.

[11] Patent Number: 5,859,176
[45] Date of Patent: Jan. 12, 1999

[54] POLYAMIDE RESIN COMPOSITION

[75] Inventors: Jun-ichi Nakahashi; Mitsuhiro Horio; Kazuo Yoshida, all of Chiba, Japan

[73] Assignee: Asahi Kasei Kogyo Kabushiki Kaisha, Osaka, Japan

[21] Appl. No.: 793,934

[22] PCT Filed: Nov. 18, 1994

[86] PCT No.: PCT/JP94/01947

§ 371 Date: Mar. 10, 1997

§ 102(e) Date: Mar. 10, 1997

[87] PCT Pub. No.: WO96/16123

PCT Pub. Date: May 30, 1996

[51] Int. Cl.⁶ .......................... C08G 69/08; C08G 73/10; C08L 77/00
[52] U.S. Cl. .......................... 528/310; 528/322; 528/332; 524/186; 524/600; 524/606; 525/92; 525/397; 525/905
[58] Field of Search ...................... 524/600, 186, 524/606; 525/92, 397, 905; 528/310, 322, 332

[56] References Cited

U.S. PATENT DOCUMENTS

| | | | |
|---|---|---|---|
| 4,315,086 | 2/1982 | Ueno et al. | 525/391 |
| 4,339,376 | 7/1982 | Kasahara et al. | 524/116 |
| 4,772,664 | 9/1988 | Ueda et al. | 525/92 |

FOREIGN PATENT DOCUMENTS

| | | |
|---|---|---|
| 0046040 | 2/1982 | European Pat. Off. . |
| 0231626 | 8/1987 | European Pat. Off. . |
| 0244090 | 11/1987 | European Pat. Off. . |
| 0304041 | 2/1989 | European Pat. Off. . |
| 0382547 A3 | 8/1990 | European Pat. Off. . |
| 63-27557 | 2/1988 | Japan . |

*Primary Examiner*—P. Hampton Hightower
*Attorney, Agent, or Firm*—Birch, Stewart, Kolasch & Birch, LLP

[57] ABSTRACT

Disclosed is a polyamide resin composition comprising a melt-kneaded product of (A) a polyamide; (B) a polyphenylene ether; (C) a styrene polymer; and (D) a compound having in a molecule thereof a carbon-to-carbon double bond and at least one functional group selected from a carboxylic acid group, an acid anhydride group, an epoxy group, an amino group and a hydroxyl group, wherein the polyamide (A) is present as a continuous phase in which the polyphenylene ether (B) and the styrene polymer (C) are dispersed individually, independently or in mixture thereof to form a dispersion phase having an average particle diameter of 5 $\mu$m or less, and wherein the (B)/(C) weight ratio is from 20/80 to 70/30, and the styrene polymer (C) in the melt-kneaded product has a reduced viscosity of 0.70 dl/g or more. The polyamide resin composition has not only excellent mechanical properties, heat resistance, molding processability, light stability, weatherability and good appearance of a shaped resin article produced therefrom, but also high resistance to a dimensional change and to a lowering of stiffness when exposed to water, and high chemical resistance. The polyamide resin composition is useful for producing various shaped resin articles, such as exterior and interior parts of automobiles, electronic parts, electric parts, civil engineering materials and construction materials.

7 Claims, 3 Drawing Sheets

2 μm

POLYAMIDE RESIN COMPOSITION

BACKGROUND OF THE INVENTION

1. Field Of The Invention

The present invention relates to a polyamide resin composition. More particularly, the present invention is concerned with a polyamide resin composition comprising a melt-kneaded product of (A) a polyamide; (B) a polyphenylene ether; (C) a styrene polymer; and (D) a compound having in a molecule thereof a carbon-to-carbon double bond and at least one functional group selected from the group consisting of a carboxylic acid group, an acid anhydride group, an epoxy group, an amino group and a hydroxyl group, wherein the polyamide (A) is present as a continuous phase in which the polyphenylene ether (B) and the styrene polymer (C) are dispersed individually, independently or in mixture thereof to form a dispersion phase having an average particle diameter of 5 μm or less, and wherein the polyphenylene ether (B) and the styrene polymer (C) are present in a specific (B)/(C) weight ratio, and the styrene polymer (C) in the melt-kneaded product has a specific reduced viscosity. The polyamide resin composition of the present invention has various excellent properties, such as excellent mechanical properties, heat resistance, molding processability, light stability and weatherability. Further, the polyamide resin composition of the present invention fully enjoys the advantageous features of a polyamide/polyphenylene ether alloy, namely, high resistance to a dimensional change and to a lowering of stiffness when exposed to water, and high chemical resistance. Therefore, the polyamide resin composition of the present invention is useful for producing various shaped resin articles, such as exterior and interior parts of automobiles, electronic parts, electric parts, civil engineering materials and construction materials.

2. Discussion Of Related Art

Polyphenylene ether resins (hereinafter frequently referred to as "PPE resins") have excellent dimensional stability, electrical properties, heat distortion resistance under a high load, water resistance, etc. The PPE resins are widely utilized in the form of a blend with a styrene polymer for commercial uses. Polyphenylene ether resins, however, have serious disadvantages in that they have poor oil resistance and molding flow properties as compared to other types of resins.

On the other hand, polyamide resins have excellent mechanical strength, oil resistance, heat resistance, etc., and have been utilized in large quantities as one of the most typical engineering plastics. However, polyamide resins have disadvantages in that they are poor in some properties, such as dimensional stability, insusceptibility to moisture absorption, heat distortion resistance under a high load, and impact resistance in the dry state, as compared to other types of resins.

Accordingly, blending of both of these resins (the blending of the resins being conducted so as to be accompanied with reactions therebetween) has been attempted in order to attain effective utilization of the respective excellent properties inherent in these resins and to compensate for the respective disadvantages of these resins. Along with such attempts, various compositions have been proposed and put into practical use.

For example, a resin composition has been proposed which employs a polyamide; a polyphenylene ether; optionally an elastomer; and a copolymer of styrene and an α, β-unsaturated carboxylic acid or an anhydride thereof as a compatibility agent for the polyamide and polyphenylene ether, wherein the polyamide is present as a continuous phase and the polyphenylene ether is present as a dispersion phase (see Examined Japanese Patent Application Publication No. 59-33614 corresponding to U.S. Pat. No. 4,339,376). This resin composition is advantageous in that it has the excellent oil resistance inherent in a polyamide and the heat resistance inherent in a polyphenylene ether. However, this resin composition has drawbacks in that it is poor in molding flow properties and light stability thereof and in appearance of a glass fiber-reinforced shaped resin article produced therefrom.

Another resin composition has been proposed which employs, as a compatibility agent for a polyamide and polyphenylene ether, a graft polymer obtained by reacting a polyamide, a polyphenylene ether, and an α, β-unsaturated carboxylic acid or an anhydride thereof to thereby link the polyamide and the polyphenylene ether to each other. This resin composition contains a polyamide; a polyphenylene ether; this compatibility agent; and optionally a rubbery polymer, wherein the polyamide is present as a continuous phase and the polyphenylene ether is present as a dispersion phase (see Examined Japanese Patent Application Publication No. 4-28748, U.S. Pat. No. 4,888,397, U.S. Pat. No. 4,654,405, EP 226910, U.S. Pat. No. 4,772,664, EP 269748, and U.S. Pat. No. 4,943,399). This resin composition is improved with respect to various properties, such as heat resistance and impact resistance. In the above-mentioned publications, it is described that a polystyrene may be incorporated into this resin composition. However, when a polystyrene is incorporated into this resin composition, the impact resistance of the resin composition is drastically lowered, to thereby make it impossible to practically use the resin composition.

As described above, there is no conventional polyamide resin composition which has a good balance of various desired properties, such as excellent mechanical properties, heat resistance, molding flow properties, light stability, good appearance of a shaped article, etc. Therefore, it has been strongly desired to develop a practically useful polyamide resin composition which is free from the above-mentioned problems of the prior art and which has all of the various desired properties simultaneously.

SUMMARY OF THE INVENTION

In the above situations, the present inventors have made extensive and intensive studies with a view toward developing a polymer alloy of a polyamide and a polyphenylene ether which solves the above-mentioned problems of the prior art. As a result, it has unexpectedly been found that a polyamide resin composition comprising a melt-kneaded product of (A) a polyamide; (B) a polyphenylene ether; (C) a styrene polymer; and (D) a compound having in a molecule thereof a carbon-to-carbon double bond and at least one functional group selected from the group consisting of a carboxylic acid group, an acid anhydride group, an epoxy group, an amino group and a hydroxyl group, wherein the polyamide (A) is present as a continuous phase in which the polyphenylene ether (B) and the styrene polymer (C) are dispersed individually, independently or in mixture thereof to form a dispersion phase having an average particle diameter of 5 μm or less, the polyphenylene ether (B) and the styrene polymer (C) being present in a (B)/(C) weight ratio of from 20/80 to 70/30, and the styrene polymer (C) in the melt-kneaded product having a reduced viscosity ηsp/C of 0.70 dl/g or more, exhibits various excellent properties, such as excellent mechanical properties, light stability, weatherability and molding flow properties thereof and good appearance of a shaped resin article produced therefrom, and also fully enjoys the advantageous features of a polyamide/polyphenylene ether alloy, namely, high resistance to a dimensional change and to a lowering of stiffness when exposed to water, and high chemical resistance, so that the polyamide resin composition is extremely useful from the practical viewpoint for a wide range of applications. The present invention has been completed, based on this novel finding.

It is, accordingly, a primary object of the present invention to provide a practically extremely useful polymer alloy of a polyamide and a polyphenylene ether, which not only has high impact strength, but is also advantageous in that (1) it has excellent resistance to light discoloration, specifically resistance to yellowing upon being irradiated with ultraviolet rays and resistance to surface whitening upon being exposed to ultraviolet rays and water in a weatherometer test; that (2) it has excellent molding flow properties, especially with respect to the molding of a shaped resin article having a thickness of 1 mm or less; and that (3) it has an excellent appearance of a glass fiber-reinforced shaped resin article produced therefrom.

The foregoing and other objects, features and advantages will be apparent to those skilled in the art from the following detailed description and claims taken in connection with the accompanying drawings.

DETAILED DESCRIPTION OF THE INVENTION

Figure 1:
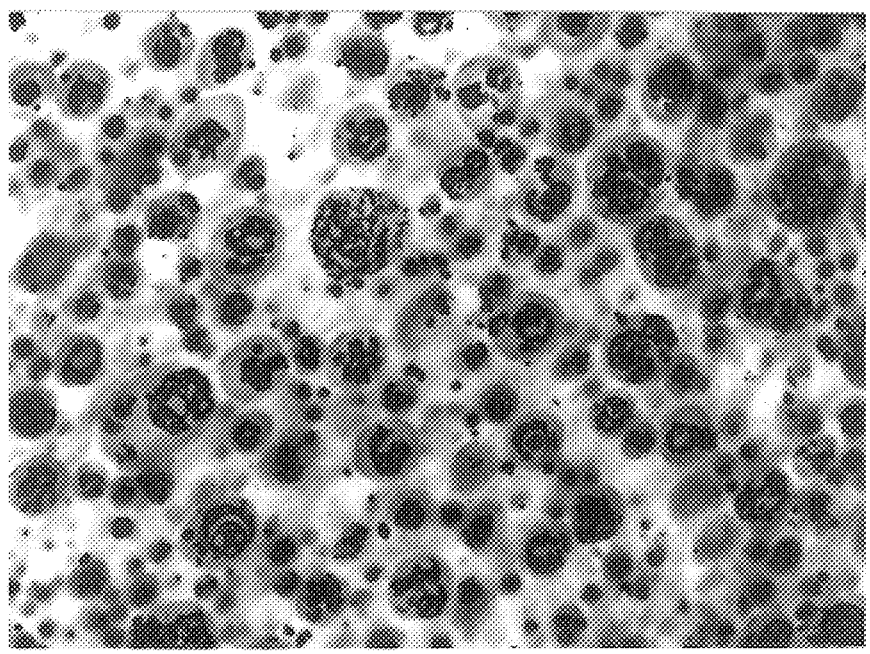
FIG. 1 is an electron photomicrograph of the polyamide resin composition obtained in Example 1, which is taken by means of a transmission-type electron microscope, utilizing an osmic acid staining method.

According to the present invention, there is provided a polyamide resin composition comprising a melt-kneaded product of:

(A) a polyamide;
(B) a polyphenylene ether;
(C) a styrene polymer; and
(D) a compound having in a molecule thereof a carbon-to-carbon double bond and at least one functional group selected from the group consisting of a carboxylic acid group, an acid anhydride group, an epoxy group, an amino group and a hydroxyl group, wherein the polyamide (A) is present as a continuous phase in which the polyphenylene ether (B) and said styrene polymer (C) are dispersed individually, independently or in mixture thereof to form a dispersion phase having an average particle diameter of 5 μm or less, the polyphenylene ether (B) and the styrene polymer (C) being present in a (B)/(C) weight ratio of from 20/80 to 70/30, and the styrene polymer (C) in the melt-kneaded product having a reduced viscosity ηsp/C of 0.70 dl/g or more.

Hereinafter, the present invention will be described in more detail.

As the polyamide component (A) of the composition of the present invention, any polyamide can be employed as long as it has amide linkages, each being represented by the formula:

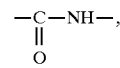

in a main chain and is capable of melting when heated.

In general, a polyamide can be synthesized by customary reactions, such as a dehydration/condensation reaction between a diamine and a dicarboxylic acid, a dehydration/condensation reaction of an aminocarboxylic acid and a ring-opening polymerization of lactam. As a method for producing a polyamide to be used in the present invention, any of these polymerization methods can be used. However, needless to say, the method for producing a polyamide is not limited to these examples.

Examples of diamines include hexamethylene diamine, 1,4-diaminobutane, 1,13-diaminotridecane, metaphenylene diamine, metaxylylene diamine, 2,4,4-trimethylhexamethylene diamine and 2,2,4-trimethylhexamethyl diamine.

Examples of dicarboxylic acids include adipic acid, sebacic acid, dodecanoic dibasic acid, 1,13-tridecanoic dibasic acid, terephthalic acid and isophthalic acid.

Examples of polyamides which can be obtained by a dehydration/condensation reaction between a diamine and a dicarboxylic acid include nylon 46, nylon 66, nylon 610, nylon 612, a polycondensation product of hexamethylene diamine and terephthalic acid (nylon 6T), a polycondensation product of trimethylhexamethylene diamine and terephthalic acid and a polycondensation product of hexamethylene diamine and isophthalic acid (nylon 6I).

Examples of aminocarboxylic acids include epsilon-aminocaproic acid, 7-aminoheptanoic acid, 8-aminooctanoic acid, 9-aminononanoic acid, 11-aminoundecanoic acid, 12-aminododecanoic acid and 13-aminotridecanoic acid.

Examples of lactams include epsilon-caprolactam and omega-laurolactam.

Examples of polyamides which can be obtained by a dehydration/condensation reaction of an aminocarboxylic acid or by a ring-opening polymerization of lactam include nylon 6, nylon 11 and nylon 12.

Examples of polyamides usable in the present invention include a copolyamide, i.e., a copolymer of any combination of at least two different polyamide units of the above-mentioned polyamides, and in the copolymer, the ratios of monomer units are not limited. Examples of copolymers of polyamide units include a copolymer of nylon 6 and nylon 66, a copolymer of nylon 6 and nylon 6T, a copolymer of nylon 6 and nylon 6I, a copolymer of nylon 6, nylon 6T and nylon 6I, a copolymer of nylon 66 and nylon 6T, a copolymer of nylon 66 and nylon 6I and a copolymer of nylon 66, nylon 6T and nylon 6I.

The above-mentioned homopolyamides and copolyamides can be used individually or in mixture in any mixing ratio.

Examples of mixtures of polyamides include a mixture of nylon 6 and nylon 66, a mixture of nylon 6 and nylon 610, a mixture of nylon 6 and nylon 612, a mixture of nylon 6 and nylon 6T, a mixture of nylon 6 and nylon 6I, a mixture of nylon 66 and nylon 610, a mixture of nylon 66 and nylon 612, a mixture of nylon 66 and nylon 6T, a mixture of nylon 66 and nylon 6I, and a combination thereof.

Preferred examples of polyamides include nylon 6, nylon 66, nylon 6T, nylon 6I, nylon 610, nylon 612, nylon 46, a copolyamide thereof, and a mixture thereof. More preferred examples of polyamides include nylon 6, nylon 66, nylon 6T, nylon 6I, nylon 610, nylon 612, a copolymer of these polyamides and a mixture of these polyamides. Most preferred examples of polyamides are nylon 6, nylon 66 and a copolymer or a mixture comprised mainly of at least one of these polyamides.

In the present invention, it is preferred that the polyamide (A) have a number average molecular weight of from 15,000 to 50,000. When the polyamide resin composition of the present invention is to be used for injection molding, it is preferred that the polyamide (A) have a number average molecular weight of from 15,000 to 25,000.

In general, the molecular weight distribution [defined as the ratio of the weight average molecular weight (Mw) to the number average molecular weight (Mn), i.e., ratio Mw/Mn] of a polyamide is 1 to 3. In the present invention, it is preferred that a polyamide having a number average molecular weight of 15,000 to 25,000 and a molecular weight distribution of 1 to 3 be used in combination with a polyamide having a number average molecular weight of more than 25,000 to 50,000 and a molecular weight distribution of 1 to 3. The use of such a combination of polyamides is effective for obtaining a polyamide resin composition having both high molding flow properties and high mechanical properties, such as impact strength and tensile strength. In this respect, it is also preferred to use, for example, the combination of a polyamide having a number average molecular weight of from 1,000 to 10,000 and a polyamide having a number average molecular weight of from 30,000 to 100,000.

The terminal groups of the polyamide (A) participate in the reaction which occurs when the polyamide (A), the polyphenylene ether (B) and the compound (D) are melt-kneaded. In general, a polyamide has an amino group and a carboxyl group as terminal groups. Which terminal group of a polyamide participates in the reaction depends on the type of the functional group of the compound (D). When the functional group of the compound (D) is a carboxylic acid group or an acid anhydride group, the functional group of the compound (D) reacts with the terminal amino group of a polyamide. When the functional group of the compound (D) is an amino group or a hydroxyl group, the functional group of the compound (D) reacts with the terminal carboxyl group of a polyamide. When the functional group of the compound (D) is an epoxy group, the functional group of the compound (D) reacts with any of the terminal amino and carboxyl groups of a polyamide.

With respect to the concentration of terminal groups of a polyamide, it is preferred that the amount of terminal groups which participate in the reaction be 10 milliequivalent/kg or more. The amount of terminal groups of a polyamide which participate in the reaction is more preferably 30 milliequivalent/kg or more. When the amount of reaction-participating terminal groups of a polyamide is 10 milliequivalent/kg or more, the reaction at the time of melt-kneading proceeds to a satisfactory extent, favorably leading to a decrease in the average particle diameter of the dispersion phase. A decrease in the average particle diameter of the dispersion phase leads not only to an improvement in mechanical properties, such as impact strength and tensile strength, but also an advantage that even when the resin composition sustains a high shearing force during insection molding, a shaped resin article having a good appearance can be obtained.

Controlling of the concentration of the terminal groups of a polyamide can be effected by any of the customary methods well known to those skilled in the art. For example, the concentration of the terminal groups of a polyamide can be controlled by regulating the amounts of a diamine, a dicarboxylic acid and a monocarboxylic acid during the synthesis of the polyamide.

The polyphenylene ether (B) of the polyamide resin composition of the present invention can be selected from a homopolymer comprising recurring units of either of the formulae (I-a) and (I-b) and a copolymer comprising prising recurring units of both the formulae (I-a) and (I-b):

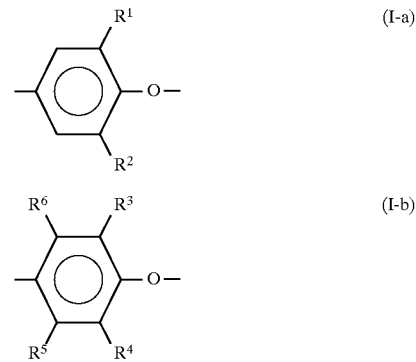

wherein each of $R^1$, $R^2$, $R^3$, $R^4$, $R^5$ and $R^6$ independently represents a monovalent residue selected from the group consisting of an alkyl group having 1 to 4 carbon atoms, an aryl group having 6 to 12 carbon atoms, a halogen atom and a hydrogen atom, provided that $R^5$ and $R^6$ are not concurrently a hydrogen atom.

Representative examples of polyphenylene ether homopolymers include poly(2,6-dimethyl-1,4-phenylene) ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloroethyl-1,4-phenylene)ether and poly(2-methyl-6-hydroxyethyl-1,4-phenylene)ether.

Examples of polyphenylene ether copolymers include copolymers having a polyphenylene ether structure as a main structure, such as a copolymer of 2,6-dimethylphenol and 2,3,6-trimethylphenol, a copolymer of 2,6-dimethylphenol and o-cresol and a copolymer of 2,6-dimethylphenol, 2,3,6-trimethylphenol and o-cresol.

As long as the desired properties of the present invention are not impaired, the polyphenylene ether to be used in the present invention may contain, as a part of its structure, various phenylene ether units which have conventionally been proposed for incorporation into polyphenylene ether resins. Examples of phenylene ether units which have conventionally been proposed for incorporation in a small amount into polyphenylene ether resins include those which are disclosed in Japanese Patent Application Laid-Open Specification No. 63-301222, i.e., 2-(dialkylaminomethyl)-6-methylphenylene ether units and 2-(N-alkyl-N-phenylaminomethyl)-6-methylphenylene ether units.

The polyphenylene ether to be used in the present invention may also contain a small amount of diphenoquinone and the like incorporated into a main chain thereof.

It is preferred that the polyphenylene ether to be used in the present invention have an intrinsic viscosity (chloroform solution, 30° C.) of from 0.30 to 1.5 dl/g, more preferably from 0.35 to 1.0 dl/g. When a polyphenylene ether having a relatively low intrinsic viscosity is used, the molding flow properties of the polyamide resin composition are high, so that the appearance of a shaped resin article tends to be improved. On the other hand, when a polyphenylene ether having a relatively high intrinsic viscosity is used, the mechanical properties, such as impact strength and tensile strength, of the polyamide resin composition tend to be increased.

In general, the polyphenylene ether to be used in the present invention may have a molecular weight distribution of 1.5 to 3.5. From the viewpoint of obtaining a polyamide resin composition having both high molding flow properties and high mechanical properties, such as impact strength and tensile strength, it is preferred to use a polyphenylene ether having a broad molecular weight distribution, for example, 3.5 to 6.0. Such a polyphenylene ether having a broad molecular weight distribution can be obtained by using a combination of a low molecular weight polyphenylene ether and a high molecular weight polyphenylene ether or by subjecting a polyphenylene ether to a molecular chain-cleaving reaction.

Examples of polymers usable as the styrene polymer (C) of the polyamide resin composition of the present invention include a homopolymer of a styrene compound and a copolymer of two or more different styrene compounds. In the present invention, a styrene compound means a compound represented by the formula (II)

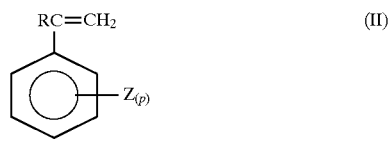

wherein R represents a hydrogen atom or an alkyl group having 1 to 4 carbon atoms, Z represents a vinyl group, a hydrogen atom, a halogen atom or an alkyl group having 1 to 4 carbon atoms, and p represents an integer of from 0 to 5.

Examples of styrene compounds include styrene, α-methyl styrene, 2,4-dimethyl styrene, monochlorostyrene, p-methyl styrene, p-tert-butyl styrene and α-ethyl styrene.

It is preferred that the styrene polymer (C) be a homopolymer of styrene, i.e., a polystyrene.

In the present invention, a copolymer of styrene and an α,β-unsaturated carboxylic acid or an anhydride thereof does not fall within the definition of the styrene polymer (C).

In the present invention, it is requisite that the styrene polymer (C) in the melt-kneaded product have a reduced viscosity ηsp/C of 0.70 dl/g or more. Therefore, with respect to the production of the polyamide resin composition of the present invention, for example, it is preferred to use as a raw material a styrene polymer (C) having a reduced viscosity ηsp/C of 0.8 dl/g or more. However, with respect to the reduced viscosity of a styrene polymer to be used as a raw material in the production of the polyamide resin composition, there is no particular limitation as long as the styrene polymer (C) in the resultant melt-kneaded product has a reduced viscosity ηsp/C of 0.70 dl/g or more. When the styrene polymer (C) in the melt-kneaded product has a reduced viscosity ηsp/C of less than 0.70 dl/g, the impact strength of the polyamide resin composition is drastically lowered, to thereby make it impossible to practically use the resin composition. It is preferred that the styrene polymer (C) in the melt-kneaded product have a reduced viscosity ηsp/C of 0.80 dl/g or more. Herein, the reduced viscosity ηsp/C of styrene polymer (C) is a value as measured with respect to a solution of a styrene polymer in toluene which has a concentration of 0.5 g/100 ml at 30° C. In order for the styrene polymer (C) in the melt-kneaded product to have the required reduced viscosity value, there can be used, for example, a method in which a styrene polymer having a very high reduced viscosity ηsp/C which would not be usually employed for injection molding is used as a raw material in the production of the polyamide resin composition; a method in which a stabilizer for a styrene polymer is added during the melt-kneading of the styrene polymer (C) together with other components, to thereby suppress a decrease in the reduced viscosity of the styrene polymer (C) during the melt-kneading; a method in which, in order to keep the components of the polyamide resin composition at a relatively low temperature, the melt-kneading of the polyphenylene ether (B) and the compound (D) is effected in the presence of the styrene polymer (C) and the optionally employable rubbery polymer (E); and a method in which the morphology of the screw of an extruder to be used for the melt-kneading is selected so that a local increase in the temperature of the components of the polyamide resin composition during the melt-kneading can be avoided.

In the present invention, there is no particular upper limit with respect to the reduced viscosity ηsp/C of the styrene polymer (C) in the melt-kneaded product. However, when the reduced viscosity ηsp/C of the styrene polymer (C) in the melt-kneaded product is too high, the melt-kneading operation tends to become difficult. Therefore, from the viewpoint of ease in the melt-kneading operation, it is preferred that the reduced viscosity ηsp/C of the styrene polymer (C) in the melt-kneaded product be not higher than 2.0 dl/g.

The method for producing the styrene polymer (C) to be used in the present invention is not particularly limited, and the styrene polymer (C) can be produced by any of the customarily employed methods, such as bulk polymerization, solution polymerization, emulsion polymerization and suspension polymerization.

It is generally preferred that the styrene polymer (C) in the melt-kneaded product have a molecular weight distribution of 1.5 to 5.

If desired, the polyamide resin composition of the present invention may further comprise a rubbery polymer (E) which has been melt-kneaded with the components (A), (B), (C) and (D), wherein the rubbery polymer (E) is dispersed, in the polyamide continuous phase, independently or in mixture thereof with at least one member selected from the group consisting of the polyphenylene ether (B) and the styrene polymer (C), to form a dispersion phase having an average particle diameter of 5 μm or less.

Examples of polymers usable as the rubbery polymer (E) include a non-hydrogenated block copolymer comprising a conjugated diene compound and a vinyl aromatic compound; a hydrogenated product of the above block copolymer; a copolymer of ethylene and an α-olefin; a copolymer of ethylene, an α-olefin and a polyene; a copolymer of ethylene, at least one member selected from the group consisting of acrylic acid and methacrylic acid, and an alkanol having 1 to 8 carbon atoms; and a rubber having a core-shell structure in which a core constituted by a copolymer of ethylene, at least one member selected from the group consisting of acrylic acid and methacrylic acid, and an alkanol having 1 to 8 carbon atoms, is surrounded by a shell constituted by polymethyl methacrylate, wherein the above core-shell structure may optionally have at least one pair of additional alternating layers formed over the shell and respectively constituted by the copolymer for the core and the compound for the shell. These rubbery polymers may be employed alone or in combination.

The above-mentioned non-hydrogenated block copolymer comprising a conjugated diene compound and a vinyl aromatic compound, is a block copolymer comprising at least one polymer block comprised mainly of conjugated diene monomer units, and at least one polymer block comprised mainly of vinyl aromatic monomer units. The number of the polymer block comprised mainly of vinyl aromatic monomer units is preferably 2 or more. In this non-hydrogenated block copolymer, the weight ratio of the vinyl aromatic monomer units to the conjugated diene monomer units is preferably in the range from 15/85 to 80/20, more preferably 25/75 to 65/35. When the weight ratio of the vinyl aromatic monomer units to the conjugated diene monomer units is smaller than 15/85, the block copolymer tends to have tackiness, thereby causing difficulties in handling thereof. On the other hand, when the above ratio is larger than 80/20, the block copolymer becomes high in modulus of elasticity, so that the ability of the block copolymer to impart an improved impact resistance to the polyamide resin composition tends to be lowered. When the above ratio is higher than 25/75, it is likely that the block copolymer as the rubbery polymer (E) is dispersed, in the polyamide continuous phase, in mixture thereof with at least one member selected from thegroup consisting of the polyphenylene ether (B) and the styrene polymer (C), and this dispersion morphology is preferred from the viewpoint of improving the heat resistance and stiffness of the final polyamide resin composition. From the viewpoint of improving impact resistance and elongation, it is preferred to use a combination of a block copolymer in which the weight ratio of the vinyl aromatic monomer units to the conjugated diene monomer units is smaller than 50/50, and a block copolymer in which the weight ratio of the vinyl aromatic monomer units to the conjugated diene monomer units is not smaller than 50/50.

The block copolymer generally has a number average molecular weight of from 30,000 to 300,000, preferably from 40,000 to 200,000. When the number average molecular weight of the block copolymer is less than 30,000, the ability of the block copolymer to impart an improved impact resistance is lowered. On the other hand, when the number average molecular weight of the block copolymer is more than 300,000, the melt-viscosity of the block copolymer becomes high, so that the conditions for the melt-kneading of the block copolymer with other components are likely to be restricted. When the molecular weight of the block copolymer is relatively high, from the viewpoint of improving the melt-flow properties and dispersion properties of the block copolymer, it is preferred to incorporate an appropriate mineral oil thereto, to thereby reduce the melt-viscosity.

Examples of conjugated diene compounds usable in the block copolymer include butadiene, isoprene and 1,3-pentadiene. These conjugated diene compounds can be used individually or in combination. Of these conjugated diene compounds, butadiene is preferred.

Examples of vinyl aromatic compounds usable in the block copolymer include styrene, a-methylstyrene and vinyltoluene. These vinyl aromatic compounds can be used individually or in combination. Of these vinyl aromatic compounds, styrene is preferred.

The molecule of the block copolymer may be of a linear, a branched or a radial structure, or a combination thereof. When butadiene is employed as the conjugated diene compound of the block copolymer, it is preferred that the microstructure of the polybutadiene block be such that the polybutadiene block has a 1,4-cis linkage content of from 20 to 50% and a 1,2-vinyl linkage content of from 5 to 40%.

The hydrogenated product of the block copolymer of a conjugated diene compound and a vinyl aromatic compound is a product prepared by hydrogenating at least a part of the aliphatic double bonds of the block copolymer. The ratio of the aliphatic double bonds which are hydrogenated, i.e., the hydrogenation degree of the block copolymer, can be arbitrarily selected in the range from more than 0% to 100%. The higher the hydrogenation degree, the higher the thermal stability of the block copolymer. Therefore, when the hydrogenation degree of the block copolymer is relatively high, a lowering of mechanical properties, such as tensile elongation and impact resistance, upon being heated during the processing or heat aging, can be effectively prevented. From the viewpoint of achieving an improved thermal stability, it is preferred that the hydrogenation degree be in the range from 70 to 100%, most preferably 100%. On the other hand, from the viewpoint of achieving an improved weld-line impact strength, it is preferred to use a non-hydrogenated block copolymer alone or in combination with a hydrogenated block copolymer. When a non-hydrogenated block copolymer is used in combination with a hydrogenated product, the amount of the non-hydrogenated block copolymer is preferably equal to or larger than the amount of the hydrogenated block copolymer. In the present invention, the term "weld-line" means the line or surface along which a polymer must reunite and adhere to itself after flowing around an interference in the mold cavity during molding. A polymer block comprised mainly of a conjugated diene has aliphatic double bonds in both a main chain thereof and a side chain thereof. When the aliphatic double bonds of only the side chain are hydrogenated, the glass transition temperature is advantageously low and the thermal stability becomes high, so that the final polyamide resin composition becomes excellent in impact resistance at a low temperature, and also in tensile elongation and impact resistance when exposed to heat during the processing and heat aging of the polyamide resin composition.

As mentioned above, a copolymer of ethylene and α-olefin can also be employed as the component (E). The α-olefin is an unsaturated hydrocarbon compound having 3 to 20 carbon atoms. Specific examples of α-olefins include propylene, butene-1, pentene-1, hexene-1, heptene-1, 4-methylbutene-1 and 4-methylpentene-1. Of these, propylene is especially preferred. In the copolymers of ethylene and α-olefin, the weight ratio of the ethylene to the α-olefin is from 5/95 to 95/5, preferably from 60/40 to 92/8. The Mooney viscosity (ML 1+4, 100° C.) of the copolymer of ethylene and α-olefin is from 5 to 200, preferably from 5 to 50. As mentioned above, a copolymer of ethylene, α-olefin and polyene can also be employed as the component (E). As the polyene, a non-conjugated diene, such as 1,4-hexadiene, dicyclopentadiene and norbornadiene, can be used. The polyene content of the copolymer of ethylene, α-olefin and polyene is preferably from 0.1 to 3%. In the copolymer of ethylene, α-olefin and polyene, the definition of α-olefin is the same as described for the copolymer of ethylene and α-olefin, and the range of the weight ratio of the ethylene to the α-olefin is the same as in the case of the copolymer of ethylene and α-olefin. The Mooney viscosity (ML 1+4, 100° C.) of the copolymer of ethylene, α-olefin and polyene is from 5 to 200, preferably from 5 to 50. For preventing the deformation of particles of this copolymer under shearing stress, it is preferred that this copolymer be crosslinked to an appropriate degree.

In the present invention, a rubbery polymer as the component (E) may be one which has been reacted with the compound (D) prior to use, thereby modifying the rubbery polymer. In this case, the modified rubbery polymer (E) tends to be dispersed, in the polyamide continuous phase, independently, but not in mixture thereof with at least one member selected from the group consisting of the polyphenylene ether (B) and the styrene polymer (C).

A preferred example of rubbery polymer (E) is at least one member selected from the group consisting of a block copolymer of a conjugated diene compound and a vinyl aromatic compound, and a hydrogenated product thereof. Especially preferred is at least one member selected from the group consisting of a block copolymer of styrene and butadiene, and a hydrogenated product thereof.

As mentioned above, the component (D) in the present invention is a compound having in a molecule thereof a carbon-to-carbon double bond and at least one functional group selected from the group consisting of a carboxylic acid group, an acid anhydride group, an epoxy group, an amino group and a hydroxyl group. Examples of compounds (D) which have a carboxylic acid group or an acid anhydride group include unsaturated dicarboxylic acids and derivatives thereof. Examples of unsaturated dicarboxylic acids and derivatives thereof include maleic acid, fumaric acid, chloromaleic acid, cis-4-cyclohexene-1,2-dicarboxylic acid and anhydrides thereof. Among unsaturated dicarboxylic acids and derivatives thereof, an α,β-unsaturated dicarboxylic acid and a derivative thereof are especially preferred. Specific examples of α, β-unsaturated dicarboxylic acids and derivatives thereof include fumaric acid, maleic acid and maleic anhydride. Of these compounds, maleic anhydride is most preferred. With respect to these unsaturated dicarboxylic acids, they can be employed even when they are in the form of esters, as long as each of the esters can be converted to a dicarboxylic acid at the processing temperature. Examples of compounds (D) having an epoxy group include acrylglycidyl ether and an epoxydated natural oil and fat. Examples of compounds (D) having a hydroxyl group include unsaturated alcohols, such as allyl alcohol, 4-pentene-1-ol, 4-pentadiene-3-ol, and unsaturated alcohols represented by the formula: $C_nH_{2n-3}OH$ (wherein n is an integer of 2 or more), unsaturated alcohols represented by the formula: $C_nH_{2n-5}OH$ (wherein n is an integer of 3 or more) and unsaturated alcohols represented by the formula: $C_nH_{2n-7}OH$ (wherein n is an integer of 4 or more). Examples of compounds (D) having an amino group include unsaturated amines having a structure in which an OH group (hydroxyl group) of the above-mentioned unsaturated alcohols is replaced by an $NH_2$ group (amino group). The above-mentioned compounds as examples of compound (D) can be used individually or in combination. The amount of the compound (D) to be used in the production of the polyamide resin composition of the present invention is in the range from 0.01 to 3 parts by weight, preferably from 0.05 to 2 parts by weight, more preferably from 0.1 to 1 part by weight, per 100 parts by weight of the total of components (A), (B) and (C). When the compound (D) is used in an amount less than 0.01 part by weight per 100 parts by weight of the total of components (A), (B) and (C), the average particle diameter of the dispersion phase is likely to be unfavorably large. On the other hand, when the compound (D) is used in an amount larger than 3 parts by weight per 100 parts by weight of the total of components (A), (B) and (C), a lowering of the molecular weight of styrene polymer (C) and a discoloration of the polyamide resin composition are disadvantageously likely to occur.

The polyamide resin composition of the present invention exhibits a dispersion morphology such that polyamide (A) is present as a continuous phase in which the polyphenylene ether (B), the styrene polymer (C) and optionally the rubbery polymer (E) are dispersed individually, independently or in mixture thereof to form a dispersion phase having an average particle diameter of 5 μm or less. It is preferred that the polyamide (A) as a continuous phase be present in an amount of from 44 to 70% by volume, based on the volume of the polyamide resin composition. When the amount of the polyamide (A) is within the above-mentioned preferred range, the polyamide resin composition is especially excellent in surface appearance of a shaped resin article produced therefrom, flowability at the time of molding, heat resistance, and dimensional stability under wet conditions.

The above-mentioned volume percentage of the polyamide (A) is based on the volume of the polyamide resin composition, inclusive of not only the essential components (A) to (D), but also any optional components and additives employed, such as component (E), other polymers and a filler. The volume of each of the components employed can be calculated by dividing the weight of each component by the density of the component (measured at 23° C.). From the thus obtained volume of each of all of the components employed, the volume percentage of polyamide (A) can be calculated.

Illustratively stated, for example, when the polyamide resin composition consists of components (A), (B), (C), (D), (E), (F), (G) and (H), the volume percentage of polyamide (A) can be obtained by the following formula:

$$\text{Volume percentage of polyamide (A)} = \frac{a/\rho_a}{a/\rho_a + b/\rho_b + c/\rho_c + d/\rho_d + e/\rho_e + f/\rho_f + g/\rho_g + h/\rho_h} \times 100$$

wherein a, b, c, d, e, f, g and h represent the respective parts by weight of the components (A) to (H) and $\rho_a$, $\rho_b$, $\rho_c$, $\rho_d$, $\rho_e$, $\rho_f$, $\rho_g$ and $\rho_h$ represent the respective densities of the components (A) to (H).

The polyamide resin composition of the present invention containing optional component (E) has a dispersion morphology such that the polyphenylene ether (B), the styrene polymer (C) and the rubbery polymer (E) are dispersed, in the continuous polyamide phase, individually, independently or in mixture of at least two members selected from the group consisting of components (B), (C) and (E). When the styrene polymer (C) is independently dispersed, from the viewpoint of improving the impact resistance and tensile elongation of the polyamide resin composition, it is preferred that the amount of the independently dispersed styrene polymer (C) be as small as possible, for example, 10 parts by weight or less per 100 parts by weight of the total of the components (A), (B) and (C). When all or a part of the polyphenylene ether (B) is independently dispersed, or when all or a part of the rubbery polymer (E) is independently dispersed, although the polyamide resin composition is slightly poor in heat resistance and stiffness, it is excellent in impact resistance and fatigue resistance properties, as long as the dispersion phase has an average particle diameter of 5 μm or less. Such a dispersion morphology that all or a part of the rubbery polymer (E) is independently dispersed in the continuous polyamide phase is likely to be obtained when the rubbery polymer (E) which has been previously reacted with a compound identical to the compound (D) is used for the production of the polyamide resin composition; or when the rubbery polymer (E) is first contacted and reacted with the compound (D) at a high temperature during the melt-kneading prior to a reaction of the rubbery polymer (E) with components other than component (D). When the components (B), (C) and (E) are dispersed in mixture thereof to form a dispersion phase, the polyamide resin composition is excellent in heat resistance and stiffness. Such a dispersion morphology that the components (B), (C) and (E) are dispersed in mixture thereof in the continuous polyamide phase is likely to be obtained when the rubbery polymer (E) is at least one member selected from the group consisting of a block copolymer of a conjugated diene compound and a vinyl aromatic compound, and a hydrogenated product thereof, wherein the weight ratio of the vinyl aromatic compound to the conjugated diene compound is 25/75 or more. Such a dispersion morphology that the components (B), (C) and (E) are dispersed in mixture thereof in the continuous polyamide phase can also be obtained, even when the rubbery polymer (E) is modified with the compound (D). However, when the rubbery polymer (E) is modified with the compound (D) to an extend which is too high, such a dispersion morphology is less likely to be obtained.

In the present invention, irrespective of the morphology of a dispersion phase, it is requisite that the dispersion phase have an average particle diameter of 5 μm or less, preferably 3 μm or less. In the present invention, the term "average particle diameter" of a dispersion phase means an average particle diameter as measured by the following method. The polyamide resin composition of the present invention is dissolved in formic acid, and subjected to measurement of an average particle diameter distribution by means of a laser diffraction-type particle diameter distribution measuring apparatus, model SALD 2000 manufactured and sold by Shimadzu Corporation, Japan, at a refractive index of 1.70–0.20i. Thus, a particle diameter distribution (cumulative distribution) of the dispersion phase is determined. The particle diameter corresponding to 50 volume % in cumulative distribution is taken as an average particle diameter of the dispersion phase.

When the average particle diameter of the dispersion phase exceeds 5 μm, the polyamide resin composition becomes poor in impact strength and tensile elongation. With respect to the average particle diameter of the dispersion phase, there is no particular lower limit. However, generally, the average particle diameter of the dispersion phase is 0.1 μm or more.

Preferred weight proportions [per 100 parts by weight of the total of components (A), (B) and (C)] of the components to be used for preparing the polyamide resin composition of the present invention are as follows:

Component (A): from 25 to 85 parts by weight, preferably from 45 to 85 parts by weight.

Component (B): from 3 to 52.5 parts by weight.

Component (C): from 4.5 to 60 parts by weight.

Component (D): from 0.01 to 3 parts by weight.

Component (E): from 0 to 50 parts by weight, preferably from 0.1 to 50 parts by weight, more preferably from 1 to 25 parts by weight.

Inorganic filler: from 0 to 100 parts by weight, preferably from 5 to 50 parts by weight.

Other polymers: from 0 to 30 parts by weight.

In the composition of the present invention, it is requisite that the components (B) and (C) be present in a (B)/(C) weight ratio of from 20/80 to 70/30, more preferably from 40/60 to 65/35. When the (B)/(C) weight ratio exceeds 70/30, the melt-flowability of the composition is unfavorably lowered, and the improvement in the light stability is small. On the other hand, when the (B)/(C) weight ratio is less than 20/80, the composition becomes poor in heat resistance and impact resistance.

The rubbery polymer (E) may or may not be used in the composition of the present invention, depending on the application fields of the composition. Use of the rubbery polymer (E) is preferred when it is intended to improve the impact resistance and coating adhesion of the composition. When it is desired to improve these properties, the rubbery polymer (E) is preferably used in an amount of from 0.1 to 50 parts by weight, per 100 parts by weight of the total of components (A), (B) and (C). When the amount of the rubbery polymer (E) is smaller than 0.1 part by weight, per 100 parts by weight of the total of components (A), (B) and (C), the desired effects cannot be obtained. On the other hand, when the amount of the rubbery polymer (E) is larger than 50 parts by weight, per 100 parts by weight of the total of components (A), (B) and (C), the composition becomes poor in heat resistance and stiffness.

Glass fibers can be used in the composition of the present invention for improving the stiffness and heat resistance of the composition. In this case, from the viewpoint of improving the stiffness and heat resistance of the composition, it is preferred not to use the rubbery polymer (E) in combination with glass fibers. However, when it is acceptable that the effects of the use of a glass fibers, i.e., improvement in stiffness and heat resistance of the composition, would not be fully exhibited, the rubbery polymer (E) may be used in combination with a glass fibers so as to improve the impact resistance of the composition.

For melt-kneading the components to prepare the polyamide resin composition of the present invention, various types of apparatuses can be employed. Examples of such apparatuses include an extruder, such as a twin-screw extruder and a single-screw extruder, a heat roll, a Banbury mixer and a kneader. Of these, an extruder is preferred, and a twin-screw extruder is most preferred. Further, it is preferred that the twin-screw extruder have screws adapted to be rotated in the same direction and have an L/D ratio of 40 or more. The temperature and time for melt-kneading vary depending on the types and weight proportions of the components to be used. Generally, however, the temperature for melt-kneading is in the range from 240° to 360° C., preferably from 260° to 340° C., and the time for melt-kneading is in the range from 0.1 to 10 minutes, preferably from 0.3 to 3 minutes. From the viewpoint of minimizing a deterioration of the resin components of the composition, it is preferred that the temperature for melt-kneading be as low as possible. Specifically, for example, it is preferred that melt-kneading of the components be conducted at a temperature which is not lower than the melting temperature of the polyamide and which is not higher than 320° C. Further, in the melt-kneading, the shearing force to be applied is preferably at least 100 sec$^{-1}$. An appropriate selection of the conditions for melt-kneading is important for attaining a desired dispersion morphology and a desired average particle diameter of the dispersion phase. When the dispersion morphology and the average particle diameter of the dispersion phase do not satisfy the respective requirements as specified in the present invention, the polyamide resin composition becomes poor in mechanical properties and surface appearance of a shaped article produced therefrom.

However, as long as the final polyamide resin composition satisfies all of the requirements defined in the present invention, the conditions for melt-kneading the components are not particularly limited. For example, all of the components can be simultaneously charged and melt-kneaded in an extruder. There can also be mentioned a preferred method in which the polyphenylene ether (B) is first reacted with the compound (D) to obtain a modified polyphenylene ether, and the modified polyphenylene ether is subsequently reacted with the polyamide (A). This method is advantageous in that the production efficiency is improved.

When the above-mentioned reaction of the polyphenylene ether (B) with the compound (D) is effected in the presence of a peroxide, the reaction rate can be improved.

When the reaction between the polyphenylene ether (B) and the compound (D) is effected in the presence of the styrene polymer (C), the melt-viscosity of the components is lowered, so that the melt-kneading can be conducted with less energy, and the temperature of the components during the melt-kneading can be held down to a relatively low level. Further, in this case, the polyphenylene ether (B) and the styrene polymer (C) can be well mixed and kneaded, so that the uniformity of the composition of the dispersion phase becomes high.

When the polyphenylene ether (B) is first reacted with the compound (D) to prepare a modified polyphenylene ether, and the styrene polymer (C) and the polyamide (A) are subsequently added thereto and melt-kneaded, the thermal history of the styrene polymer (C) can be reduced to a minimum and, therefore, a lowering of the molecular weight can be prevented.

When the reaction between the polyphenylene ether (B) and the compound (D) is effected in the presence of the rubbery polymer (E), the melt-viscosity of the components is lowered (as in the case where components (B) and (D) are reacted in the presence of component (C) as described above), so that the melt-kneading can be conducted with less energy, and the temperature of the components during the melt-kneading can be held down to a relatively low level. However, in this case, when the rubbery polymer (E) has a high content of unsaturated bonds, a thermal deterioration of the rubbery polymer (E) is likely to occur. Therefore, it is preferred to employ a method in which the polyphenylene ether (B) is first modified with the compound (D), and the rubbery polymer (E) is charged together with the polyamide (A), and kneaded with the modified polyphenylene ether.

With respect to the manner of use of an inorganic filler, it is preferred that the inorganic filler be added to the composition after all components (A) to (E) have been melt-kneaded. By using an inorganic filler, the mechanical properties and thermal properties can be improved.

In the present invention, if desired, other polymers can be added to the composition of the present invention, as long as the desired properties of the present invention are not impaired. For example, a polymer-type dispersant can be added to the composition of the present invention to facilitate a uniform micro-dispersion of the dispersion phase in the polyamide continuous phase. Examples of such polymer-type dispersants include a styrene-butadiene block copolymer in which the weight ratio of the styrene polymer block to the butadiene polymer block is relatively high, e.g., from 70/30 to 95/5, and a modified block copolymer which is obtained by reacting the above-mentioned styrene-butadiene block copolymer with compound (D). The addition of a polymer-type dispersant is preferred because the impact strength of the composition of the present invention can be further improved.

If desired, various types of additives can further be added to the composition of the present invention. Examples of additives include a reinforcing agent, such as glass fibers, carbon fibers or whiskers; a filler in a particulate or fibrous form; a fire retardant, such as an organic phosphate or a halogen compound; a plasticizer; a stabilizer which is suitable for use with a polyamide, e.g., a copper compound, an alkali metal salt of iodine, bromine or the like, or a stabilizer which is suitable for use with a polymer, e.g., a hindered phenol, a phosphorous compound or a hindered amine; an ultraviolet absorber; a colorant, such as carbon black or titanium oxide; a mold release agent, such as a metallic salt of stearic acid or of montanic acid, or ethylene-bis-stearamide; and an electrical conductivity agent, such as Ketjen Black.

BEST MODE FOR CARRYING OUT THE INVENTION

Hereinbelow, the present invention will be described in more detail with reference to the following Examples and Comparative Examples, but they should not be construed as limiting the scope of the present invention.

In the Examples and Comparative Examples, the following materials were used as components (A) to (I).

(A) Polyamide
- (A-1): 6,6-nylon having a relative viscosity ($\eta r$) of 2.01 (as measured at 25° C. with respect to a 95.5% sulfuric acid solution thereof) and having a density of 1.14 g/cm$^3$
- (A-2): 6-nylon having a relative viscosity ($\eta r$) of 2.45 (as measured at 25° C. with respect to a 95.5% sulfuric acid solution thereof) and having a density of 1.14 g/cm$^3$ (B) Polyphenylene ether
- (B-1): poly(2,6-dimethyl-1,4-phenylene)ether having an intrinsic viscosity of 0.38 dl/g (as measured at 30° C. with respect to a chloroform solution thereof) and having a density of 1.06 g/cm$^3$
- (B-2): poly(2,6-dimethyl-1,4-phenylene)ether having an intrinsic viscosity of 0.50 dl/g (as measured at 30° C. with respect to a chloroform solution thereof) and having a density of 1.06 g/cm$^3$ (C) Polystyrene
- (C-1): a polystyrene having a reduced viscosity ($\eta sp/C$) of 0.92 dl/g (as measured at 30° C. with respect to a toluene solution thereof) and having a density of 1.05 g/cm$^3$
- (C-2): a polystyrene having a reduced viscosity ($\eta sp/C$) of 1.13 dl/g (as measured at 30° C. with respect to a toluene solution thereof) and having a density of 1.05 g/cm$^3$
- (C-3): a polystyrene having a reduced viscosity ($\eta sp/C$) of 0.72 dl/g (as measured at 30° C. with respect to a toluene solution thereof) and having a density of 1.05 g/cm$^3$
- 5 (C-4): a polystyrene having a reduced viscosity ($\eta sp/C$) of 0.80 dl/g (as measured at 30° C. with respect to a toluene solution thereof) and having a density of 1.05 g/cm$^3$
- (C-5): a polystyrene having a reduced viscosity ($\eta sp/C$) of 0.51 dl/g (as measured at 30° C. with respect to a toluene solution thereof) and having a density of 1.05 g/cm$^3$ (D) A compound having in a molecule thereof a carbon-to-carbon double bond and at least one functional group selected from the group consisting of a carboxylic acid group, an acid anhydride group, an epoxy group, an amino group and a hydroxyl group
- (D-1): Maleic anhydride (E) Rubbery polymer
- (E-1): Styrene-butadiene block copolymer (TUF-PRENE 200, manufactured and sold by Asahi Chemical Industry Co., Ltd., Japan) having a density of 0.94 g/cm$^3$.

(E-2): Hydrogenated styrene-butadiene block copolymer (TUFTEC H1061, manufactured and sold by Asahi Chemical Industry Co., Ltd., Japan) having a density of 0.91 g/cm$^3$.

(F) Peroxide (F-1): di-t-butyl peroxide (F-2): dicumyl peroxide (G) Styrene-maleic anhydride copolymer (G-1): DYLARK 232, manufactured and sold by Arco Chemical Co., U.S.A., which has a density of 1.08 g/cm$^3$ (H) Glass fiber (H-1): Glass fibers having a fiber diameter of 13 μm, a length of 3 mm and a density of 2.40 g/cm$^3$, and the surface of which has been treated with an aminosilane (I) Rubber-reinforced polystyrene (I-1): A rubber-reinforced polystyrene containing 12% by weight of a polybutadiene, and having a rubber particle diameter of 0.8 μm and a density of 1.05 g/cm$^3$ In each of the Examples and Comparative Examples, a specimen was prepared from a pelletized composition by means of an injection molding machine, model IS80C (manufactured and sold by Toshiba Machine Co., Ltd., Japan) under conditions such that the cylinder temperature is 280° C., the mold temperature is 80° C., and the molding cycle time is 1 minute. The properties of the specimen were determined in accordance with the test methods described below. The morphology of the specimen was varied depending on the test method as described below. With respect to the average particle diameter of the dispersion phase, the volume percentage of the polyamide, and the ηsp/C of the polystyrene, measurements were also conducted according to the following test methods.

(1) Light discoloration (ΔYI)

A specimen having a size of 2 inch×½ inch×⅛ inch was prepared. The YI (Yellow Index) value of the specimen was measured by means of a calorimeter and, then, the specimen was exposed to ultraviolet rays at a wavelength of 313 nm for 5 hours. After the exposure, the YI value of the specimen was again measured. The YI value before the exposure was subtracted from the YI value after the exposure to obtain a ΔYI value. The smaller the ΔYI value, the higher the resistance to light discoloration (yellowing).

(2) Izod impact strength

A notched specimen having a size of 2 inch×½ inch×⅛ inch was prepared. The Izod impact strength of the specimen was measured in accordance with ASTM D256 (measuring temperature: 23° C.).

(3) Impact brittle break ratio

A specimen having a size of 90 mm×50 mm×2.5 mm was prepared. The following test (Drop-weight impact test) was conducted by means of a GRAPHIC IMPACT TESTER (manufactured and sold by TOYO SEIKI SEISAKU-SHO, Ltd., Japan).

The specimen was horizontally held between upper and lower holding rings each having a hole of a 38-mm diameter so that both holes are positioned to be in register with each other. A falling weight having a weight of 11.5 kg was lifted above the specimen to a height of 130 cm (distance between the forward end of the falling weight and the upper surface of the specimen), and allowed to fall and collide with the specimen at its portion exposed through the hole of the upper holding ring. The test was conducted 5 times, and in every test, a fresh specimen was used.

The ratio of the number of broken specimens suffering a brittle fracture to the number of specimens tested, is shown in Table 3.

(4) Heat distortion temperature

A specimen having a size of 5 inch×½ inch×⅛ inch was prepared. The heat distortion temperature was measured in accordance with ASTM D648 (load: 4.6 kg/cm$^2$ and 18.6 kg/cm2).

(5) Average particle diameter of a dispersion phase

A polyamide resin composition was dissolved in formic acid, and subjected to measurement of an average particle diameter distribution by means of a laser diffraction-type particle diameter distribution measuring apparatus, model SALD2000 manufactured and sold by Shimadzu Corporation, Japan, at a refractive index of 1.70–0.20i. Thus, the particle diameter distribution (cumulative distribution) of the dispersion phase was determined. The particle diameter corresponding to 50 volume % in cumulative distribution was taken as an average particle diameter of the dispersion phase.

(6) Surface appearance

A specimen having a size of 90 mm×50 mm×2.5 mm was prepared. The surface appearance of the specimen was examined by the naked eye in accordance with the following three criteria:

○: good

Δ: fair x: poor (7) Whitening in a weatherometer test

A specimen having a size of 2 inch×½ inch×⅛ inch was prepared. The specimen was subjected to a weatherometer test by means of a SUNSHINE LONG-LIFE WEATHER METER manufactured and sold by Suga Test Instruments Co., Ltd., Japan, at 63° C. for 100 hours under rainy conditions. Any whitening on the surface of the specimen was examined by the naked eye in accordance with the following three criteria:

○: no whitening

Δ: slight whitening x: drastic whitening (8) Small-thickness molding flow

A specimen having a spiral shape and having a width of 5 mm was prepared. The thickness of the specimen was varied from 0.3 mm to 3.2 mm, as described in Table 1. In each of Examples 1 and 4 and Comparative Example 3, each given below, the length of molding flow was measured with respect to each of specimens having respective thicknesses of 0.3 mm, 0.7 mm, 1.0 mm and 3.2 mm. Then, the respective lengths of molding flow in Examples 1 and 4 and Comparative Example 3 were divided by the length of molding flow in Comparative Example 3. Based on the resultant values, the small-thickness molding flow of a polyamide resin composition was evaluated in Examples 1 and 4 and Comparative Example 3.

(9) Volume percentage of a polyamide

The volume percentage of a polyamide in a polyamide resin composition was calculated from the respective densities and weight proportions of all components used for preparing the polyamide resin composition.

(10) Reduced viscosity (ηsp/C) of a polystyrene in a polyamide resin composition A polyamide matrix as a continuous phase in the pellets of a polyamide resin composition which had been obtained by extrusion-molding was melted with formic acid, and the resultant mixture was subjected to centrifugation to thereby separate a dispersion phase therefrom. Then, the dispersion phase was washed with methanol and dried. The dried dispersion phase was treated with toluene to obtain a mixture, and the mixture was subjected to centrifugation.

Then, the upper layer of the centrifuged mixture was collected, and a polystyrene and a polyphenylene ether in the upper layer were precipitated from methanol. The precipitated mixture of polystyrene and polyphenylene ether was dried. The dried mixture was dissolved in methylene chloride at room temperature and allowed to stand at −10° C. for 24 hours, to thereby crystallize the polyphenylene ether. The polyphenylene ether was filtered off to obtain a methylene chloride solution of the polystyrene. The obtained methylene chloride solution was treated with methanol to obtain the polystyrene, followed by drying. Toluene was added to the dried polystyrene. The reduced viscosity ($\eta$sp/C) of the polystyrene is measured at 30° C. with respect to a 0.5 g/dl toluene solution of the polystyrene. The above-mentioned drying procedure was conducted under vacuum at 50° C. for 10 hours.

EXAMPLE 1

Extrusion molding of a composition was carried out using a twin-screw extruder which contains a plurality of zones including a first stage zone and a second stage zone. The first stage zone of the extruder has a hopper for feeding components (B), (C) and (D), and the second stage zone of the extruder has a vent for feeding other components. The rotation directions of the two screws are the same, and each of the screws has a diameter of 25 mm.

24 parts by weight of component (B-1), 16 parts by weight of component (C-1), and 0.16 part by weight of component (D-1) as a modifier were fed to the first stage zone of the twin-screw extruder through the hopper. On the other hand, 50 parts by weight of component (A-1), 10 parts by weight of component (E-1), 0.15 part by weight of tris(2,4-di-t-butylphenyl)phosphite (IRGAFOS 168, manufactured and sold by Ciba-Geigy Limited, Switzerland), 0.15 part by weight of zinc oxide, 0.15 part by weight of zinc sulfide and, as colorants, 0.5 part by weight of titanium oxide and 0.0015 part by weight of carbon black were fed to the second stage zone of the extruder through the vent. Extrusion-molding of the resultant composition was performed at 300° C. at 300 rpm, to thereby obtain pellets.

Then, a specimen was prepared from the pellets by injection molding according to the method as specifically described above, and the properties of the specimen were determined in accordance with the test methods as specifically described above. With respect to the average particle diameter of the dispersion phase, the volume percentage of polyamide, and the $\eta$sp/C of polystyren, measurements were conducted according to the test methods as also specifically described above. Results are shown in Table 1.

An electron photomicrograph of the polyamide resin composition obtained in Example 1 is shown in FIG. 1. The electron photomicrograph of FIG. 1 was taken by means of a transmission-type electron microscope, utilizing an osmic acid staining method. With respect to the electron photomicrograph of FIG. 1, the magnification is indicated by a unit line (having a length of 1 cm) shown below the photomicrograph, which represents an actual length of 2 $\mu$m.

EXAMPLES 2 to 4 AND COMPARATIVE EXAMPLES 1 to 4

Substantially the same procedure as in Example 1 was repeated, except that the weight ratio of component (B) to component (C) [(B)/(C) weight ratio] was changed as shown in Table 1. Results are also shown in Table 1.

From the results of Example 1 and Examples 2 to 4 and Comparative Examples 1 to 4, it is found that when the (B)/(C) weight ratio is greater than 70/30, the light discoloration ($\Delta$YI) after ultraviolet radiation for 5 hours is remarkable so that yellowing occurs, and that the whitening in a weatherometer test is also remarkable (Comparative Examples 2, 3 and 4). On the other hand, it is also found that when the (B)/(C) weight ratio is smaller than 20/80, the Izod impact strength is low, and the surface appearance of the specimen is poor (Comparative Example 1).

The length of molding flow which was measured with respect to each of specimens having respective thicknesses of 0.3 mm, 0.7 mm, 1.0 mm and 3.2 mm in Comparative Example 3 is given below.

| Thickness | Length of molding flow |
|---|---|
| 0.3 mm | 3.7 mm |
| 0.7 mm | 63 mm |
| 1.0 mm | 145 mm |
| 3.2 mm | 397 mm |

The respective lengths of molding flow in Examples 1 and 4 and Comparative Example 3 were divided by the length of molding flow in Comparative Example 3. Based on the resultant values, the small-thickness molding flow of polyamide resin composition was evaluated in Examples 1 and 4 and Comparative Example 3.

From the results, it is found that the specimens which have been prepared from the pelletized compositions containing a polystyrene as component (C) (Examples 1 and 4) are excellent in molding flow as compared to the specimen which has been prepared from the pelletized composition not containing a polystyrene as component (C) (Comparative Example 3). The above tendency is clearly observed, especially with respect to the specimens having a thickness of 1.0 mm or less.

COMPARATIVE EXAMPLES 5 AND 6

Substantially the same procedure as in Example 1 was repeated, except that the weight proportion of component (D-1) was changed as shown in Table 1 and, component (F-1) as a peroxide was added to the composition in Comparative Example 5, and component (F-2) was added to the composition in Comparative Example 6. Each of components (F-1) and (F-2) was fed to the first stage zone of the extruder through the hopper. Results are shown in Table 1.

EXAMPLES 5 to 7

Substantially the same procedure as in Example 1 was repeated, except that the weight proportions of components (A), (B) and (C) were changed as shown in Table 2. Results are shown in Table 2.

EXAMPLES 8 to 10 AND COMPARATIVE EXAMPLES 7 to 8

Substantially the same procedure as in Example 1 was repeated, except that the weight proportions of components (A), (B) and (C) were changed as shown in Table 3, and the weight proportions of titanium oxide and carbon black were changed to 3 parts by weight and 0.05 part by weight, respectively. Results are shown in Table 3.

From the results of Examples 8 to 10 and Comparative Examples 7 and 8, it is found that when $\eta$sp/C of a polystyrene in the resin composition is less than 0.7 dl/g, the Izod impact strength is low and the impact brittle break ratio is high (Comparative Examples 7 and 8).

Figure 2:
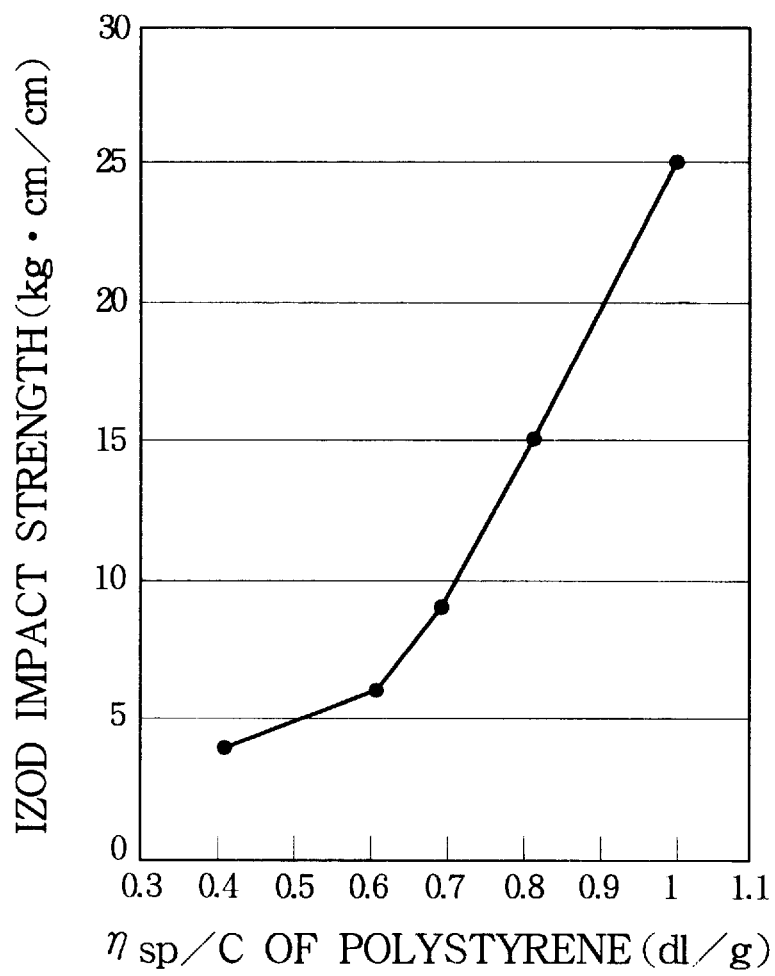
FIG. 2 is a graph showing the relationships between the reduced viscosity (ηsp/C) of a polystyrene used in a polyamide resin composition and the Izod impact strength of the polyamide resin composition, taken with respect to the respective polyamide resin compositions of Examples 8 to 10 and Comparative Examples 9 and 10.

With respect to the respective polyamide resin compositions of Examples 8 to 10 and Comparative Examples 7 and 8, the relationships between the reduced viscosity ($\eta sp/C$) of a polystyrene used in a polyamide resin composition and the Izod impact strength of the polyamide resin composition are shown in FIG. 2.

Figure 3:
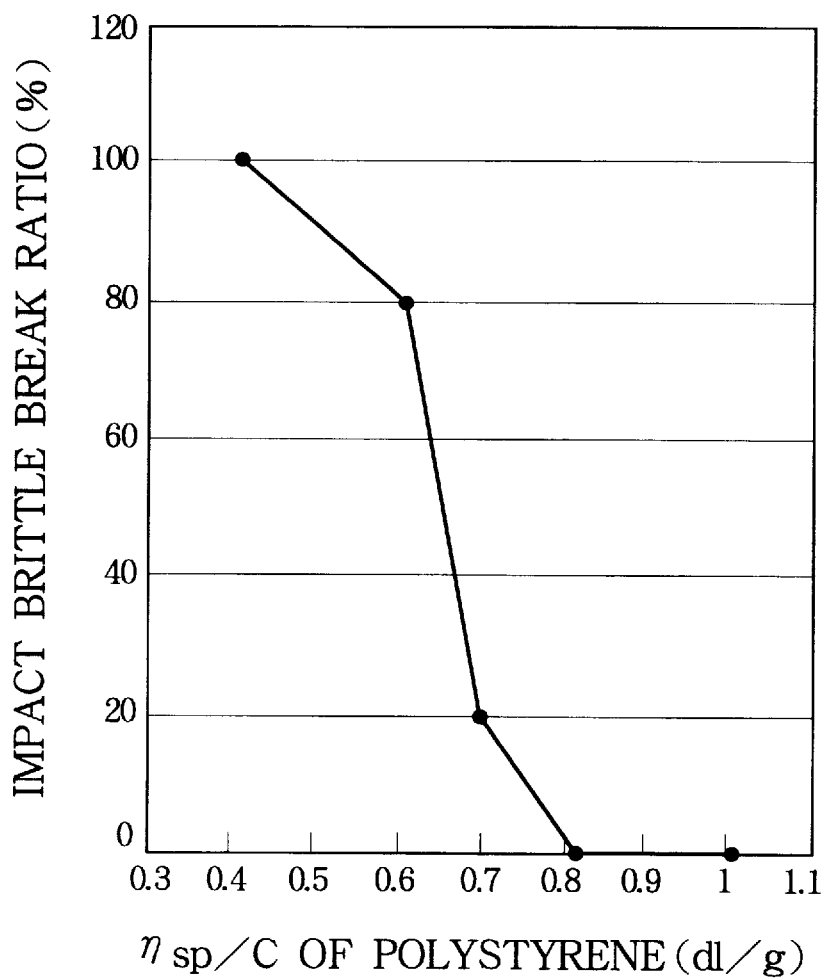
FIG. 3 is a graph showing the relationships between the reduced viscosity (ηsp/C) of a polystyrene used in a polyamide resin composition and the impact brittle break ratio of the polyamide resin composition, taken with respect to the respective polyamide resin compositions of Examples 8 to 10 and Comparative Examples 9 and 10.

With respect to the respective polyamide resin compositions of Examples 8 to 10 and Comparative Examples 7 and 8, the relationships between the reduced viscosity ($\eta sp/C$) of a polystyrene used in a polyamide resin composition and the impact brittle break ratio of the polyamide resin composition are shown in FIG. 3.

COMPARATIVE EXAMPLE 9

Substantially the same procedure as in Example 8 was repeated, except that the weight proportion of component (D-1) was changed to 0.01 part by weight. Results are shown in Table 3.

COMPARATIVE EXAMPLE 10

Substantially the same procedure as in Example 8 was repeated, except that the weight proportion of component (C-1) was changed to 10 parts by weight, and 10 parts by weight of component (G-1) was added to the resin composition. Component (G-1) was fed to the second stage zone of the extruder. Results are shown in Table 3.

COMPARATIVE EXAMPLE 11

Substantially the same procedure as in Example 8 was repeated, except that component (C-1) was not used and 20 parts by weight of component (G-1) was added to the resin composition. Component (G-1) was fed to the second stage zone of the extruder. Results are shown in Table 3.

EXAMPLE 11

Substantially the same procedure as in Example 8 was repeated, except that component (E-2) was used instead of component (E-1). Results are shown in Table 4.

EXAMPLE 12

Substantially the same procedure as in Example 8 was repeated, except that each of the weight proportions of component (B-2) and component (C-1) was changed to 25 parts by weight, and component (E-1) was not used. Results are shown in Table 4.

EXAMPLE 13

Substantially the same procedure as in Example 8 was repeated, except that the weight proportions of components (B-2), (C-1) and (E-1) were changed as shown in Table 4. Results are shown in Table 4.

EXAMPLE 14

21 parts by weight of component (B-2), 15 parts by weight of component (C-1) and 0.15 part by weight of component (D-1) as a modifier were fed to the first stage zone of a twin-screw extruder (which is of the same type as employed in Example 1) through the hopper. On the other hand, 47 parts by weight of component (A-2), 5 parts by weight of component (E-2), 0.15 part by weight of tris(2,4-di-t-butylphenyl)phosphite (IRGAFOS 168, manufactured and sold by Ciba-Geigy Limited, Switzerland), 0.15 part by weight of zinc oxide, 0.15 part by weight of zinc sulfide, and 0.5 part by weight of carbon black as a colorant were fed to the second stage zone of the above-mentioned extruder through the vent. Extrusion-molding of the resultant composition was performed at 300° C. at 300 rpm, to thereby obtain pellets.

Then, 90 parts by weight of the obtained pellets were fed to the first stage zone of a twin-screw extruder (which is of the same type as used above) through the hopper. On the other hand, 10 parts by weight of component (H-1) were fed to the second stage zone of the above-mentioned extruder through the vent. Extrusion-molding of the resultant composition was performed at 280° C. at 300 rpm, to thereby obtain pellets.

Then, a specimen was prepared from the pellets by injection molding according to the method as specifically described above, and the properties of the specimen were determined in accordance with the test methods as specifically described above. With respect to the average particle diameter of the dispersion phase, the volume percentage of polyamide, and the $\eta sp/C$ of polystyren, measurements were conducted according to the test methods as also specifically described above. Results are shown in Table 4.

COMPARATIVE EXAMPLE 12

Substantially the same procedure as in Example 14 was repeated, except that the weight proportion of component (B-2) was changed to 38 parts by weight, and component (C-1) was not used. Results are shown in Table 4.

From the results of Example 14 and Comparative Example 12, it is found that with respect to compositions in which a glass fiber is blended, the surface appearance of a specimen which has been prepared from a pelletized composition containing a polystyrene (Example 14) is good as compared to a specimen which has been prepared from a pelletized composition not containing a polystyrene Comparative Example 12.

COMPARATIVE EXAMPLE 13

Substantially the same procedure as in Example 11 was repeated, except that 20 parts by weight of component (I-1) were used instead of 20 parts by weight of component (C-1). Results are shown in Table 4.

TABLE 1

| | Example Nos. and Comparative Example Nos. | | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|
| Formulation (part by weight) | Polyamide | A-1 | 50 | 50 | 50 | 50 | 50 | 50 | 50 | 76 | 50 | 50 |
| | | A-2 | | | | | | | | | | |
| | Polyphenylene ether | B-1 | 24 | 28 | 12 | 8 | 0 | 32 | 40 | 24 | 24 | 24 |
| | | B-2 | | | | | | | | | | |
| | Polystyrene | C-1 | 16 | 12 | 28 | 32 | 40 | 8 | 0 | 0 | 16 | 16 |
| | | C-2 | | | | | | | | | | |

TABLE 1-continued

| | Example Nos. and Comparative Example Nos. | | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|
| | | C-3 | | | | | | | | | | |
| | Maleic anhydride | D-1 | 0.16 | 0.16 | 0.16 | 0.16 | 0.16 | 0.16 | 0.16 | 0.16 | 0.72 | 0.40 |
| | Rubbery polymer | E-1 | 10 | 10 | 10 | 10 | 10 | 10 | 10 | 0 | 10 | 10 |
| | | E-2 | | | | | | | | | | |
| | Peroxide | F-1 | | | | | | | | | 0.48 | |
| | | F-2 | | | | | | | | | | 0.008 |
| Properties | Light discoloration | (ΔYI) | 33 | 35 | 26 | 23 | — | 41 | 43 | 44 | 38 | 35 |
| | Izod impact strength | (kg·cm/cm) | 10 | 15 | 6 | 4 | 2 | 18 | 22 | 3 | 4 | 5 |
| | Heat distortion | 4.6 kg | 148 | 162 | 120 | 110 | — | 173 | 190 | 205 | 140 | 142 |
| | temperature (°C.) | 18.6 kg | 118 | 118 | 106 | 100 | — | 117 | 115 | 95 | 103 | 106 |
| | Average particle diameter | (μm) | 1.4 | 1.6 | 2.1 | 2.3 | cannot be measured | 1.6 | 1.9 | 1.2 | 1.3 | 1.4 |
| | Surface appearance | | ○ | ○ | ○ | ○ | x | ○ | ○ | ○ | Δ - x | Δ |
| | Whitening in a weather-ometer test | | ○ | ○ | ○ | ○ | — | Δ | x | x | — | — |
| | Small-thickness molding flow | | | | | | | | | | | |
| | 0.3 mm thickness | | 2.1 | | | 2.7 | | | | 1.0 | | |
| | 0.7 mm thickness | | 1.6 | | | 2.3 | | | | 1.0 | | |
| | 1.0 mm thickness | | 1.3 | | | 1.7 | | | | 1.0 | | |
| | 3.2 mm thickness | | 1.1 | | | 1.3 | | | | 1.0 | | |
| | Volume % of polyamide | (vol %) | 47.5 | 47.5 | 47.4 | 47.4 | 47.4 | 47.5 | 47.6 | 74.7 | 47.5 | 47.5 |
| | (B)/(C) weight ratio | | 60/40 | 70/30 | 30/70 | 20/80 | 0/100 | 80/20 | 100/0 | 100/0 | 40/60 | 40/60 |
| | η sp/C of polystyrene | (dl/g) | 0.82 | 0.83 | 0.80 | 0.76 | 0.79 | 0.80 | — | — | 0.60 | 0.68 |

TABLE 2

| | Example Nos. and Comparative Example Nos. | | Ex. 5 | Ex. 6 | Ex. 7 |
|---|---|---|---|---|---|
| Formulation (part by weight) | Polyamide | A-1 | 48 | 60 | 70 |
| | | A-2 | | | |
| | Polyphenylene ether | B-1 | 25.2 | 18 | 12 |
| | | B-2 | | | |
| | Polystyrene | C-1 | 16.8 | 12 | 8 |
| | | C-2 | | | |
| | | C-3 | | | |
| | Maleic anhydride | D-1 | 0.16 | 0.16 | 0.16 |
| | Rubbery polymer | E-1 | 10 | 10 | 10 |
| | | E-2 | | | |
| Properties | Light discoloration | (ΔYI) | 34 | 29 | 24 |
| | Izod impact strength | (kg·cm/cm) | 12 | 14 | 12 |
| | Heat distortion temperature (°C.) | 4.6 kg | 148 | 155 | 170 |
| | | 18.6 kg | 121 | 110 | 104 |
| | Average particle diameter | (μm) | 1.4 | 1.3 | 1.4 |
| | Surface appearance | | ○ | ○ | ○ |
| | Volume % of polyamide | (vol %) | 45.5 | 57.4 | 67.5 |
| | (B)/(C) weight ratio | | 60/40 | 60/40 | 60/40 |
| | η sp/C of polystyrene | (dl/g) | 0.83 | 0.80 | 0.76 |

TABLE 3

| | Example Nos. and Comparative Example Nos. | | Ex. 8 | Ex. 9 | Ex. 10 | Comp. Ex. 7 | Comp. Ex. 8 | Comp. Ex. 9 | Comp. Ex. 10 | Comp. Ex. 11 |
|---|---|---|---|---|---|---|---|---|---|---|
| Formulation (part by weight) | Polyamide | A-1 | | | | | | | | |
| | | A-2 | 50 | 50 | 50 | 50 | 50 | 50 | 50 | 50 |
| | Polyphenylene ether | B-1 | | | | | | | | |
| | | B-2 | 20 | 20 | 20 | 20 | 20 | 20 | 20 | 20 |
| | Polystyrene | C-1 | 20 | | | | | 20 | 10 | |
| | | C-2 | | 20 | | | | | | |
| | | C-3 | | | 20 | | | | | |

TABLE 3-continued

| | Example Nos. and Comparative Example Nos. | | Ex. 8 | Ex. 9 | Ex. 10 | Comp. Ex. 7 | Comp. Ex. 8 | Comp. Ex. 9 | Comp. Ex. 10 | Comp. Ex. 11 |
|---|---|---|---|---|---|---|---|---|---|---|
| | | C-4 | | | 20 | | | | | |
| | | C-5 | | | | | 20 | | | |
| | Maleic anhydride | D-1 | 0.16 | 0.16 | 0.16 | 0.16 | 0.16 | 0.01 | | |
| | Rubbery polymer | E-1 | 10 | 10 | 10 | 10 | 10 | 10 | 10 | 10 |
| | | E-2 | | | | | | | | |
| | Styrene-maleic anhydride copolymer | G-1 | | | | | | | 10 | 20 |
| Properties | Light discoloration | (ΔYI) | 16 | 16 | 16 | 16 | 16 | 18 | 22 | 23 |
| | Izod impact strength | (kg·cm/cm) | 15 | 25 | 9 | 6 | 4 | 3 | 2 | 2 |
| | Impact brittle break ratio, 23° C. (No. of broken specimens/no. of specimens tested) | | 0/5 | 0/5 | 1/5 | 4/5 | 5/5 | 5/5 | 5/5 | 5/5 |
| | Heat distortion temperature | 4.6 kg | 136 | 136 | 135 | 134 | 135 | 134 | 135 | 135 |
| | (°C.) | 18.6 kg | 112 | 111 | 110 | 104 | 105 | 98 | 98 | 97 |
| | Average particle diameter (μm) | | 1.2 | 1.6 | 1.0 | 1.1 | 1.2 | 7.0 | 15 | 13 |
| | Surface appearance | | ○ | ○ | ○ | ○ | ○ | x | x | x |
| | Volume % of polyamide | (vol %) | 47.5 | 47.5 | 47.5 | 47.5 | 47.5 | 47.5 | 47.6 | 47.6 |
| | (B)/(C) weight ratio | | 50/50 | 50/50 | 50/50 | 50/50 | 50/50 | 50/50 | 67/33 | 100/0 |
| | η/sp/C of polystyrene | (dl/g) | 0.82 | 1.01 | 0.70 | 0.61 | 0.41 | 0.83 | — | — |

TABLE 4

| | Example Nos. and Comparative Example Nos. | | Ex. 11 | Ex. 12 | Ex. 13 | Ex. 14 | Comp. Ex. 12 | Comp. Ex. 13 |
|---|---|---|---|---|---|---|---|---|
| Formulation (part by weight) | Polyamide | A-1 | | | | | | |
| | | A-2 | 50 | 50 | 50 | 47 | 47 | 50 |
| | Polyphenylene ether | B-1 | | | | | | |
| | | B-2 | 20 | 25 | 22 | 21 | 38 | 20 |
| | Polystyrene | C-1 | 20 | 25 | 15 | 17 | | |
| | | C-2 | | | | | | |
| | | C-3 | | | | | | |
| | | C-4 | | | | | | |
| | | C-5 | | | | | | |
| | Maleic anhydride | D-1 | 0.16 | 0.16 | 0.16 | 0.15 | 0.15 | 0.16 |
| | Rubbery polymer | E-1 | | | 13 | | | |
| | | E-2 | 10 | | | 5 | 5 | 10 |
| | Glass fiber | H-1 | | | | 10 | 10 | |
| | Rubber-reinforced polystyrene | I-1 | | | | | | 20 |
| Properties | Light discoloration | (ΔYI) | 16 | 15 | 16 | — | — | 17 |
| | Izod impact strength | (kg·cm/cm) | 18 | 3 | 70 | 10 | 10 | 7 |
| | Heat distortion temperature | 4.6 kg | 135 | 139 | 144 | 204 | 204 | 133 |
| | (°C.) | 18.6 kg | 111 | 126 | 106 | 142 | 182 | 109 |
| | Average particle diameter | (μm) | 1.0 | 1.0 | 1.1 | 0.9 | 0.9 | 1.1 |
| | Surface appearance | | ○ | ○ | ○ | ○ | x | ○ |
| | Volume % of polyamide | (vol %) | 47.3 | 46.9 | 47.3 | 47.4 | 47.5 | 47.3 |
| | (B)/(C) weight ratio | | 50/50 | 50/50 | 60/40 | 55/45 | 100/0 | 50/50 |
| | η sp/C of polystyrene | (dl/g) | 0.80 | 0.81 | 0.82 | 0.80 | — | 0.60 |

What is claimed is:

1. A polyamide resin composition comprising a melt-kneaded product of:

(A) a polyamide comprising at least one polyamide selected from the group consisting of nylon 6, nylon 66, nylon 6T, nylon 6I, nylon 610, nylon 612, a copolymer of these polyamides and a mixture of these polyamides;

(B) a polyphenylene ether;

(C) a styrene polymer comprising at least one styrene polymer obtained by polymerizing at least one styrene compound represented by the following formula

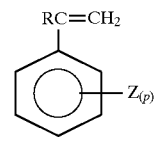

wherein R represents a hydrogen atom or an alkyl group having 1 to 4 carbon atoms, Z represents a vinyl group, a hydrogen atom, a halogen atom or an alkyl group having 1 to 4 carbon atoms, and p represents an integer of from 0 to 5;

(D) a compound having in a molecule thereof a carbon-to-carbon double bond and at least one functional group selected from the group consisting of a carboxylic acid group, an acid anhydride group, an epoxy group, an amino group and a hydroxyl group, wherein said polyamide (A) is present as a continuous phase in which said polyphenylene ether (B) and said styrene polymer (C) are dispersed individually, independently or in mixture thereof to form a dispersion phase having an average particle diameter of 5 µm or less, said polyphenylene ether (B) and said styrene polymer (C) being present in a (B)/(C) weight ratio of from 20/80 to 70/30, and said styrene polymer (C) in said melt-kneaded product having a reduced viscosity ηsp/C of 0.70 dl/g or more.

2. The polyamide resin composition according to claim 1, further comprising a rubbery polymer (E) which has been melt-kneaded with said components (A), (B), (C) and (D), wherein said rubbery polymer (E) is dispersed, in said polyamide continuous phase, independently or in mixture thereof with at least one member selected from the group consisting of said polyphenylene ether and said styrene polymer, to form a dispersion phase having an average particle diameter of 5 µm or less.

3. The polyamide resin composition according to claim 1 or 2, wherein said polyamide (A) is present in an amount of from 44 to 70% by volume, based on the volume of said polyamide resin composition.

4. The polyamide resin composition according to claim 1 or 2, wherein said compound (D) is at least one member selected from the group consisting of an α,β-unsaturated dicarboxylic acid and a derivative thereof.

5. The polyamide resin composition according to claim 1 or 2, wherein said styrene polymer (C) in said melt-kneaded product has a reduced viscosity ηsp/C of 0.80 dl/g or more.

6. The polyamide resin composition according to claim 1 or 2, wherein said styrene polymer (C) is a styrene homopolymer.

7. The polyamide resin composition according to claim 2, wherein said rubbery polymer (E) is at least one member selected from the group consisting of a non-hydrogenated block copolymer comprising a conjugated diene compound and a vinyl aromatic compound, and a hydrogenated product of said block copolymer.

* * * * *